United States Patent [19]
Ohtake

[11] Patent Number: 5,617,163
[45] Date of Patent: Apr. 1, 1997

[54] CAMERA WITH ILLUMINATING OPTICAL SYSTEM

[75] Inventor: Motoyuki Ohtake, Ohmiya, Japan

[73] Assignee: Nikon Corporation, Tokyo, Japan

[21] Appl. No.: 667,335

[22] Filed: Jun. 20, 1996

Related U.S. Application Data

[63] Continuation of Ser. No. 356,970, Dec. 16, 1994, abandoned.

[30] Foreign Application Priority Data

Dec. 22, 1993 [JP] Japan .................................. 5-325029
Mar. 29, 1994 [JP] Japan .................................. 6-082453

[51] Int. Cl.$^6$ ................................................. G03B 15/03
[52] U.S. Cl. ............................................. 396/176; 362/16
[58] Field of Search ........................... 354/149.11, 149.1; 362/16, 17, 18, 244, 245

[56] References Cited

U.S. PATENT DOCUMENTS 4,356,538  10/1982  Plummer .
4,460,942  7/1984  Pizzuti et al. .
5,055,976  10/1991  Arai .

FOREIGN PATENT DOCUMENTS 2-138733  11/1990  Japan .

Primary Examiner—David M. Gray
Attorney, Agent, or Firm—Staas & Halsey

[57] ABSTRACT

A camera equipped with an illuminating optical system for illuminating a phototaking range of a phototaking lens is configured so that the illuminating optical system includes a light source and a direction unit for directing a light beam from the light source to illuminate the phototaking range, and so that the direction unit composed of includes a Fresnel lens having a cylindrical envelope plane.

10 Claims, 15 Drawing Sheets

CAMERA WITH ILLUMINATING OPTICAL SYSTEM

This application is a continuation of application Ser. No. 08/356,970, filed Dec. 16, 1994, now abandoned.

BACKGROUND OF THE INVENTION

1. Field of the Invention

The present invention relates to a camera provided with an illuminating optical system.

2. Related Background Art

FIG. 14 is an elevation view of a camera provided with a conventional illuminating optical system.

The camera shown in FIG. 14 is provided with a camera body 1, on which there are provided, on the front side (object side) thereof, with a phototaking lens 2, an illuminating unit 4 and a view finder window 6 as illustrated in FIG. 14.

In order to avoid the red eye phenomenon (eyes of a person appearing red on the photograph), the illuminating unit 4 is positioned as far as possible from the phototaking lens 2. More specifically, when the camera body 1 is viewed from the front side, the illuminating unit 4 is positioned at the upper right or upper left corner of the camera body 1.

FIG. 15 shows the relationship between the range of illumination by the illuminating optical system and the range of phototaking by the phototaking lens, and FIG. 16 shows the structure of the illuminating optical system.

Referring to FIG. 15, a film plane 20 is positioned opposite to the object with respect to the phototaking lens 2, and the optical axis 3 of the phototaking lens 2 passes the center thereof and of the film plane 20. Consequently the phototaking range 17 of the phototaking lens 2 is defined laterally symmetrically with respect to the optical axis 3, by a line 7 connecting the center of the phototaking lens 2 with the right-hand end of the film plane 20 and by a line 8 connecting the center of the phototaking lens 2 with the left-hand end of the film plane 20. Stated differently, the phototaking range 17 of the phototaking lens 2 is defined by the paths 7, 8 of two outermost rays entering the phototaking lens 2.

The structure of the optical system of said illuminating unit 4 is shown, in a perspective view, in FIG. 16. The illuminating optical system is composed of a straight xenon tube (xenon flash lamp) 11, a Fresnel lens 12 and a reflector 13. There are also represented a longitudinal direction 14 of the xenon lamp 11, a central rotary axis 15 of the Fresnel lens 12, and a direction 16 perpendicular to the longitudinal direction 14 of the xenon tube 11 and to the central rotary axis 15 of the Fresnel lens 12.

In order that the phototaking range 17 of the phototaking lens 2 can be satisfactorily illuminated by the illuminating optical system, the position of the xenon lamp 11 is defined by a line 9 connecting the center of the Fresnel lens 12 with the right-hand end of the phototaking range 17 and a line 10 connecting the center of the Fresnel lens 12 with the left-hand end of the phototaking range 17. More specifically, the position of the xenon lamp 11 in the longitudinal direction 14 is defined by paths 9, 10 of the two outermost rays of the illuminating optical system.

The Fresnel lens 12 is positioned in the illuminating direction of the xenon tube 11, constituting the light emitting source, while the reflector 13 is positioned at the opposite direction, whereby the light emitted from the xenon lamp 11 is directed, either directly or after reflection by the reflector 13, by the Fresnel lens 12 to illuminate the phototaking range of the phototaking lens 2.

In such arrangement, if the illuminated range of the illuminating optical system is wider than the phototaking range 17 of the phototaking lens 2, a desired illumination intensity cannot be given to the phototaking range unless the amount of light emitted from the illuminating optical system is increased. On the other hand, if the illuminated range of the illuminating optical system is narrower than the phototaking range 17 of the phototaking lens 2, a desired illumination intensity cannot be obtained in a part of the phototaking range. For this reason, the illuminated range has been made as close as possible to the phototaking range.

The external shape of the Fresnel lens 12 has an aspect ratio matching that of the phototaking range of the phototaking lens 2. Since the xenon tube 11 is of straight form, the length Lx of the Fresnel lens 12 in the longitudinal direction 14 of the xenon tube is larger than the length Ly in the perpendicular direction 16. The reflector 13 is so formed as to surround the xenon tube 11.

FIGS. 17A and 17B are respectively a cross-sectional view and a plan view, showing the form of the Fresnel surface of a conventional Fresnel lens 12.

As shown in these drawings, the Fresnel lens 12 has a Fresnel surface 18 at the side of the light source (i.e. the xenon tube 11) and a flat surface 19 at the side of the illuminated range. The Fresnel surface 18 is constructed rotationally symmetrical about the optical axis 15. Consequently the refractive power of the Fresnel surface 18 is constant if the distance from the optical axis 15 of the Fresnel lens 12 is given.

In recent years, the camera bodies are designed in various forms, with increasing use of complex curved surfaces in which the curvature varies gradually. When the external form of the camera body is composed of such complex curved surface, it is desirable, for the aesthetic purpose, that the surface closest to the illuminated range (i.e. phototaking range) of the illuminating optical system, or the surface, closest to the illuminated range, of the Fresnel lens is also formed as a curved surface matching that of the camera body.

However, if the external form of the Fresnel lens is varied in order to give priority to the compactness or design of the camera body, it is not possible to obtain, by means of the Fresnel lens 12 only, the light distribution characteristics capable of satisfactorily illuminating the phototaking range of the phototaking lens, since the central rotary axis 15 of the Fresnel lens 12 is perpendicular to the Fresnel surface 18 as shown in FIG. 17A so that the light distribution characteristics is constant in every direction.

Also in the conventional camera employing a Fresnel lens with a rotationally symmetrical Fresnel surface as explained above, the refractive power of the Fresnel surface is constant in any direction, solely depending on the distance from the rotational center as explained in the foregoing. Consequently, if a complex curved surface is formed on the Fresnel lens at the side of the illuminated range, there will result a deviation in the light distribution in case of the conventional Fresnel lens of the rotationally symmetrical form, so that the phototaking range of the phototaking lens cannot be satisfactorily illuminated. Therefore the camera equipped with the conventional illuminating optical system has been limited in the freedom in designing the camera body.

An illuminating optical system in which the Fresnel lens is made eccentric on its surface at the object side (side of the illuminated range) is disclosed for example in the Japanese Utility Model Laid-open Application No. 2-138733. However, such illuminating optical system can correct the parallax to the optical axis of the phototaking lens but is unable to increase the freedom in designing the camera body, since the central axis of the Fresnel lens is still perpendicular to the Fresnel surface as in the conventional structure.

It is also conceivable to modify the light distribution characteristics by forming each annular part constituting the Fresnel surface into a rotationally asymmetrical shape, in which the Fresnel angle varies depending on the angle about the central axis, but such rotationally asymmetrical shape is extremely difficult to produce in practice.

SUMMARY OF THE INVENTION

In consideration of the foregoing, the object of the present invention is to provide a camera equipped with an illuminating optical system capable of satisfactorily illuminating the phototaking range of the phototaking lens and increasing the freedom in designing of the camera body.

The above-mentioned object can be attained, according to a first aspect of the present invention, by a camera provided with an illuminating optical system for illuminating the phototaking range of the phototaking lens, said illuminating optical system comprising a light source and direction means for directing the light beam from said light source so as to illuminate the phototaking range, wherein said direction means is a Fresnel lens component with a cylindrical envelope plane.

There is preferably satisfied an additional relationship:

$$Lx > Ly$$

wherein $Lx$ is the external size of the direction means along the rotary axis of the cylindrical envelope plane, and $Ly$ is the external size of said direction means in a direction perpendicular to the rotary axis of the cylindrical envelope plane.

FIG. 1 is a perspective view showing the arrangement of an illuminating optical system according to the first aspect of the present invention, and FIG. 2 is a cross-sectional view showing the shape of a lens component in FIG. 1. Referring to FIGS. 1 and 2, the illuminating optical system is composed of a xenon tube 21, a lens component 22 and a reflector 23. There are also shown a direction 29 of the rotary axis of the cylindrical envelope plane of the lens component, a direction 25 of the central axis of the external shape of the lens component, a direction 26 perpendicular to the directions 29 and 25, and a longitudinal direction 24 of the xenon tube.

FIG. 2 is a cross-sectional view of the lens component 22 shown in FIG. 1, along a plane containing the rotary axis 29 thereof.

In the present invention, the lens component 22 is formed in the following manner, in order to direct the light beam from the xenon tube 21 so as to achieve satisfactory illumination of a predetermined range.

Firstly, the envelope plane of the lens component 22 is formed as cylindrical, thereby reforming the light distribution in the direction 26 perpendicular to the rotary axis of said cylindrical envelope plane.

Secondly, the cross section containing the rotary axis 29 of the cylindrical envelope plane is formed as a Fresnel lens structure, thereby reforming the light distribution in the direction 29 of said rotary axis.

The above-explained shape of the lens component of the present invention enables to independently reform the light distribution in the direction 29 along the rotary axis of the cylindrical envelope plane and that in the direction 26 perpendicular to said rotary axis, whereby the light distribution characteristics can be rectified solely by the lens component.

Also the lens component of the illuminating optical system of the present invention can be easily produced despite of its rotationally asymmetrical surface, because the Fresnel shape thereof is not the conventional annular one but has truncated conical planes with a cylindrical envelope plane.

Further in the present invention, in order to better reform the light distribution, there is preferably adopted a configuration satisfying the following condition (1):

$$Lx > Ly \qquad (1)$$

wherein $Lx$ is the external size of the lens component 22 along the rotary axis 29 of the cylindrical envelope plane or the truncated conical plane, while $Ly$ is the external size of said lens component in the direction 26 perpendicular to the rotary axis of the truncated conical planes.

Said condition (1) defines the external shape of the lens component. In general, the lens component can be made thinner by the use of Fresnel structure.

Consequently, a larger external size of the lens component in the direction 29 is effective in reforming the light distribution, since the difference in thickness between the central area and the peripheral area becomes smaller. On the other hand, a larger external size of the lens component 22 along the direction 26 is unfavorable for manufacture, since the difference in thickness between the central area and the peripheral area becomes larger and the required work becomes more difficult.

Furthermore, if the xenon tube is straight in the present invention, the lens component is preferably shaped longer the longitudinal direction of the xenon tube than in the perpendicular direction. Consequently the longitudinal direction 24 of the xenon tube should preferably coincide with the direction 29 of the central rotary axis of the truncated conical plane.

According to a second aspect of the present invention, there is provided a camera equipped with an illuminating optical system for illuminating the phototaking range of the phototaking lens, composed of a light source and a Fresnel lens component for refracting the light from the light source so as to illuminate the phototaking range, wherein a face of said Fresnel lens component, at the side of the illuminated range, is inclined to the optical axis of the phototaking lens while the other face of said Fresnel lens component at the light source side has a cylindrical envelope plane and is formed as a Fresnel structure consisting of plural Fresnel elements each having a truncated conical plane, and at least either of the Fresnel angle and the shape of the truncated conical plane of each Fresnel element is varied among the plural Fresnel elements, depending on the inclination of the face of the Fresnel lens component at the side of the illuminated range with respect to the optical axis of the phototaking lens, whereby the deviation of the light beam, resulting from the inclination of the face of the Fresnel lens component at the side of the illuminated range, can be compensated.

Preferably, each Fresnel element has a rectangular shape. More preferably the light source is rod-shaped, and the central axis of the cylindrical envelope plane is substantially parallel to the longitudinal axis of the light source.

Now referring to FIGS. 3 and 4 showing the optical arrangement of the illuminating optical system according to the second aspect of the present invention, a face 37 of the Fresnel lens 32, at the side of the light source or the xenon tube 31, are formed as a Fresnel structure having a cylindrical envelope planes. On the other hand, the other face 38 of the Fresnel lens 32, at the side of the illuminated range or phototaking range, is formed as a curved surface, matching that of the camera body. In FIG. 3, the xenon tube 31 is only indicated by the longitudinal axis thereof.

The rotary axis 39 of the Fresnel surface 37 having a cylindrical envelope plane is perpendicular to the central axis 35 of the external size (center line perpendicular to longer external size). In FIG. 3, an arrow 36 indicates a direction perpendicular to the central axis of the Fresnel surface 37 and to the central axis 35 of the external size of the Fresnel lens 32, while an arrow 34 indicates the longitudinal direction of the xenon tube 31.

FIG. 4 is a cross-sectional view of the Fresnel lens 32 shown in FIG. 3, along a plane containing the central axis 39 and 35.

In the following there will be explained the method for satisfactorily illuminating the phototaking range of the phototaking lens.

In the present invention, the light distribution in the direction 36 perpendicular to the rotary axis 39 of the Fresnel surface 37 is made uniform by forming the surface 37 of the Fresnel lens 32, at the side of the xenon tube 31, as a Fresnel structure having a cylindrical envelope plane. Also the light distribution along the direction of the rotary axis 39 is made uniform by forming the cross-sectional shape of the Fresnel surface 37, along a plane containing the rotary axis 39 and the central axis 35 of the external shape, as a Fresnel structure.

By forming the Fresnel surface 37 of the Fresnel lens in the Fresnel structure explained above, it is rendered possible to reform the light distribution independently in the direction along the rotary axis 39 of said Fresnel surface 37 and in the direction 36 perpendicular to said rotary axis 39.

In the illuminating optical system of the present invention, each Fresnel element of the Fresnel lens 32 preferably has a rectangular external shape. Such form enables easy manufacture despite of the rotationally asymmetrical form of the Fresnel surface.

In the following there will be explained a method for satisfactorily correcting the deviation of the light beam, resulting from the inclination of a face, at the side of the illuminated range, of the Fresnel lens with respect to the optical axis of the phototaking lens (such deviation being hereinafter called "deviation resulting from the face inclination at the illuminated range side").

Said inclination of the face of the Fresnel lens at the illuminated range side means that said face at the illuminated range side is not in a plane perpendicular to the optical axis of the phototaking lens. There are therefore included a situation where the face at the illuminated range side is not formed flat and a situation where said face is formed flat but is not substantially perpendicular to the optical axis of the phototaking lens.

FIG. 5 is a perspective view showing the configuration of the Fresnel elements, in the Fresnel lens 32 of the illuminating optical system of the present invention. The external shape of each of the Fresnel elements A–I is rectangular, when viewed in a direction perpendicular to the rotary axis 39 of the Fresnel surface 37 having the cylindrical envelope plane.

In the present invention, when the face of the Fresnel lens 32 at the illuminated range side is inclined, for example by formation of a rotationally asymmetrical surface such as a cylindrical surface, the deviation of the light beam resulting from the face inclination at the illuminated range side is corrected by suitably varying the Fresnel angle and the shape of the cylindrical plane (defined by radius and center of curvature) of each Fresnel element among the different Fresnel elements, according to the shape of the face at the illuminated range side.

For example, if the face at the illuminated range side has a local curvature in the direction of the rotary axis 39, namely if it is inclined in the direction of said rotary axis 39, as in a third embodiment to be explained later, the above-mentioned deviation of the light beam resulting from the face inclination at the illuminated range side can be corrected by suitable variation of the Fresnel angles of the Fresnel elements.

Also if the face at the illuminated range side has a curvature in the direction of the rotary axis 39 and if the radius of curvature in the direction 36 perpendicular to the rotary axis 39 is constant for different Fresnel elements but the centers of curvature are not on a straight line, namely if the inclination exists also in the direction 36 perpendicular to the rotary axis 39, as in a fourth embodiment to be explained later, the above-mentioned deviation of the light beam resulting from the face inclination at the illuminated range side can be corrected by suitable variation of the Fresnel angles of the Fresnel elements, combined with suitable variation in the positions of the centers of curvature of the Fresnel elements with respect to the direction 36.

Furthermore, though not indicated in the following embodiments, if the face at the illuminated range side is so formed that the radius of curvature in the direction 36 perpendicular to the rotary axis 39 varies along the direction of the rotary axis 39, the radius of curvature of the cylindrical plane is suitably varied among the Fresnel elements and the positions of the centers of curvature (with respect to the direction 36) are also suitably varied among the Fresnel elements. In this manner the above-mentioned deviation of the light beam resulting from the face inclination at the illuminated range side can be corrected by selecting the refractive power of the Fresnel elements, in the direction 36 perpendicular to the rotary axis 39, respectively at predetermined values.

Furthermore, in case the xenon tube is rod-shaped, for example consisting of a cylindrical straight tube, the Fresnel lens preferably has a rectangular external shape, longer along the longitudinal direction 34 of the xenon tube 31 than in the perpendicular direction 36. Stated differently, the longitudinal direction 34 of the xenon tube 31 is preferably parallel to the rotary axis 39 of the cylindrical envelope plane of the Fresnel lens.

The foregoing and other objects, features and advantages of the present invention are explained hereinafter and may be better understood by reference to the drawings and the descriptive matter which follows.

BRIEF DESCRIPTION OF THE DRAWINGS

FIGS. 10A to 10E are views showing the optical arrangement of the illuminating optical system constituting a third embodiment of the present invention, wherein FIGS. 10A and 10C are respectively a front view and a lateral view of a Fresnel surface 67 of a Fresnel lens 62, FIG. 10B is a cross-sectional view along a line 10C—10C in FIG. 10A, FIG. 10D is a magnified partial view of FIG. 10C, and FIG. 10E is a cross-sectional view along a line 10E—10E in FIG. 10A;

FIGS. 12A to 12C are views showing the optical arrangement of the illuminating optical system constituting a fourth embodiment of the present invention, wherein FIGS. 12A and 12B are respectively a front view and a lateral view of a Fresnel surface 77 of a Fresnel lens 72, and FIG. 12C is a plan view of the Fresnel lens 72;

FIGS. 13A to 13E are views corresponding to FIGS. 12A to 12C, wherein FIG. 13A is an end face view along a line 13A—13A in FIG. 12A, FIG. 13B is an end face view along a line 13B—13B in FIG. 12A, FIG. 13C is a cross-sectional view along a line 13C—13C in FIG. 12A, and FIGS. 13D and 13E are magnified partial views respectively of FIGS. 13A and 13B;

DETAILED DESCRIPTION OF THE PREFERRED EMBODIMENTS

First Embodiment

Figure 1:
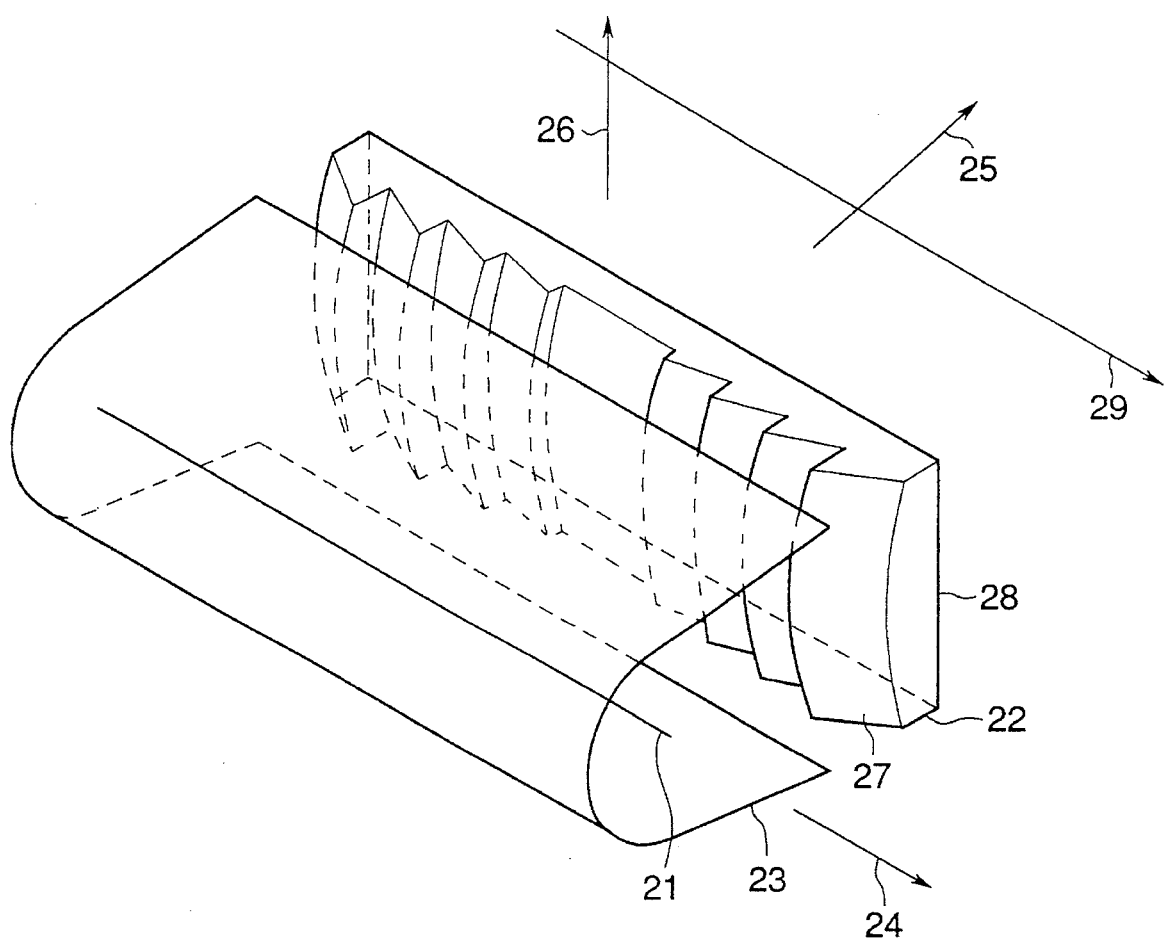
FIG. 1 is a perspective view showing the optical arrangement of the illuminating optical system according to a first aspect of the present invention.
Figure 2:
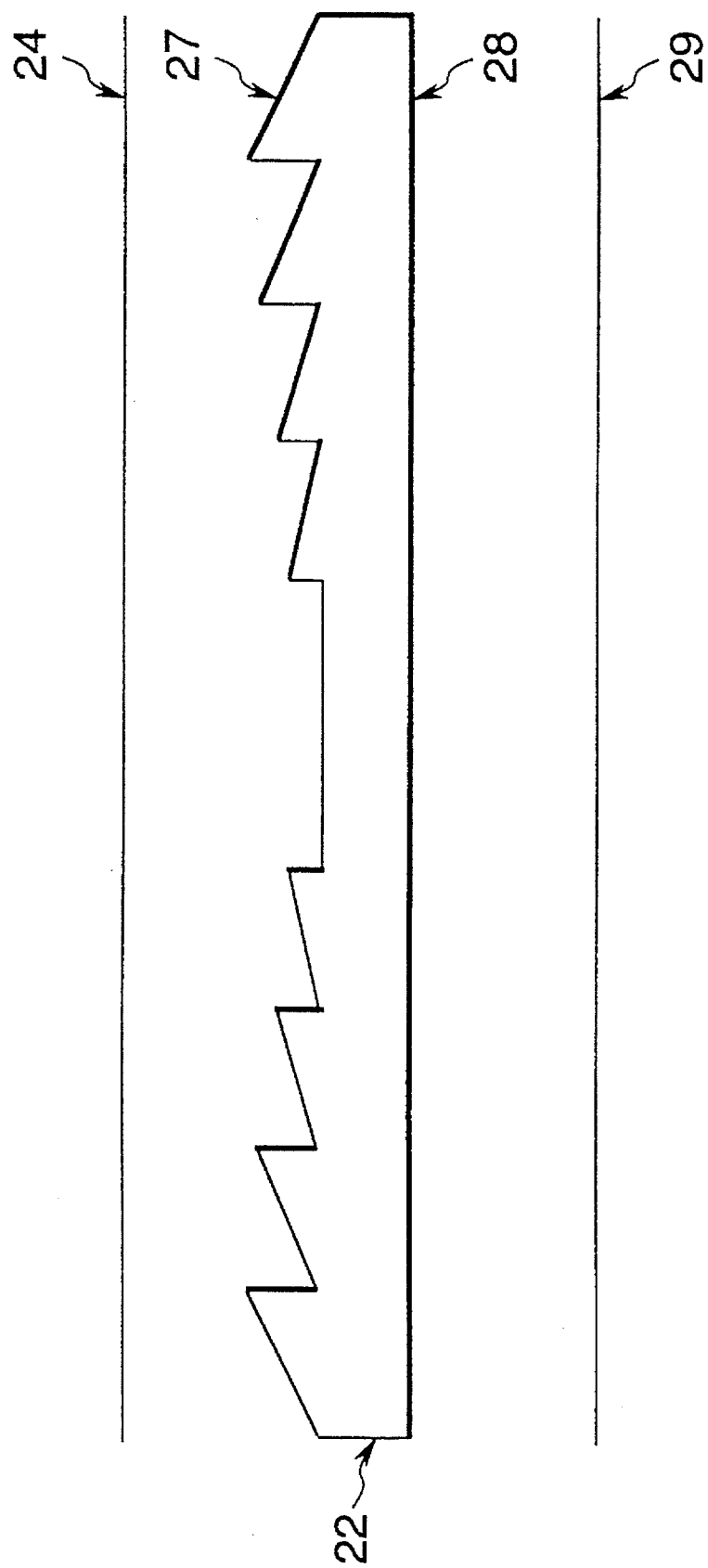
FIG. 2 is a cross-sectional view showing the shape of a lens component shown in FIG. 1.
Figure 3:
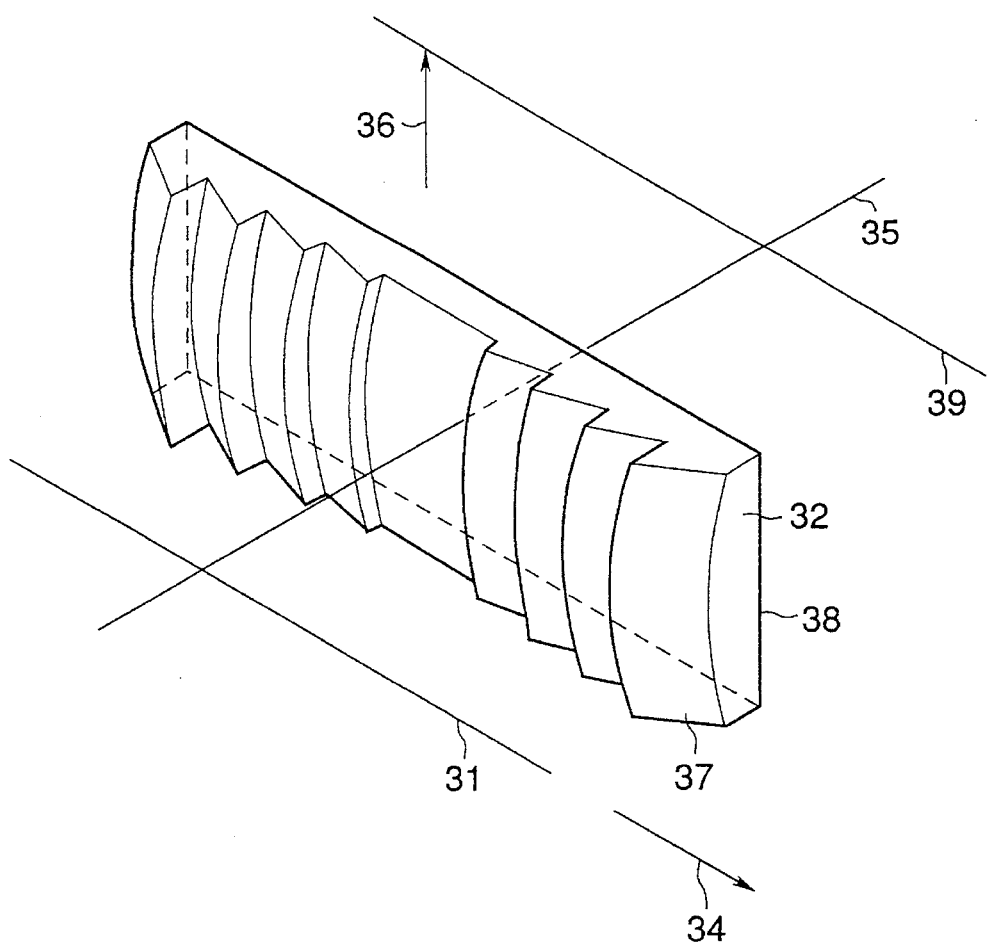
FIG. 3 is a perspective view showing the optical arrangement of the illuminating optical system according to a second aspect of the present invention.
Figure 4:
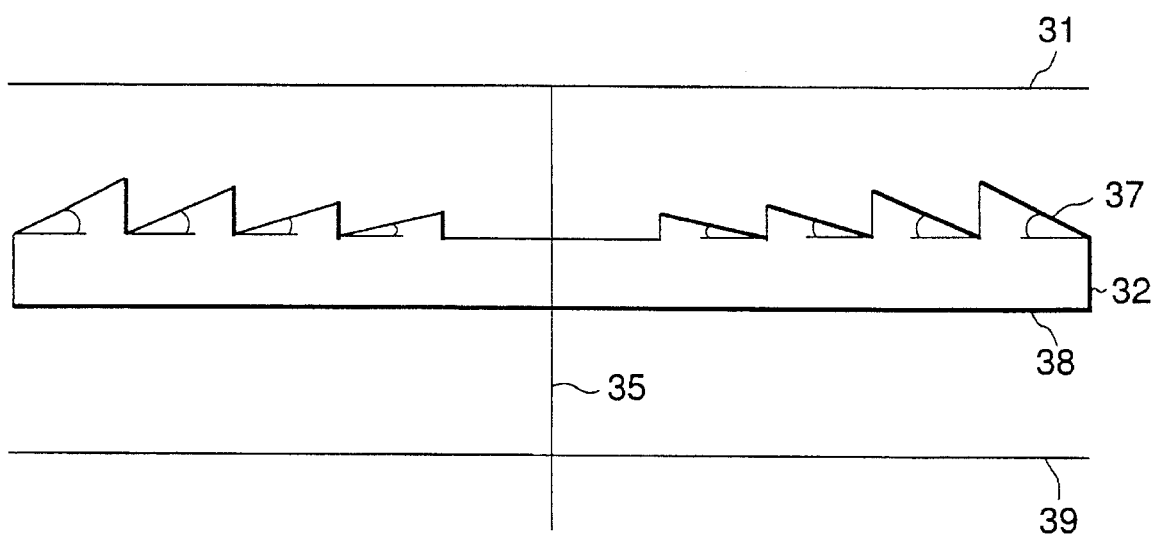
FIG. 4 is a cross-sectional view of a Fresnel lens shown in FIG. 3.
Figure 5:
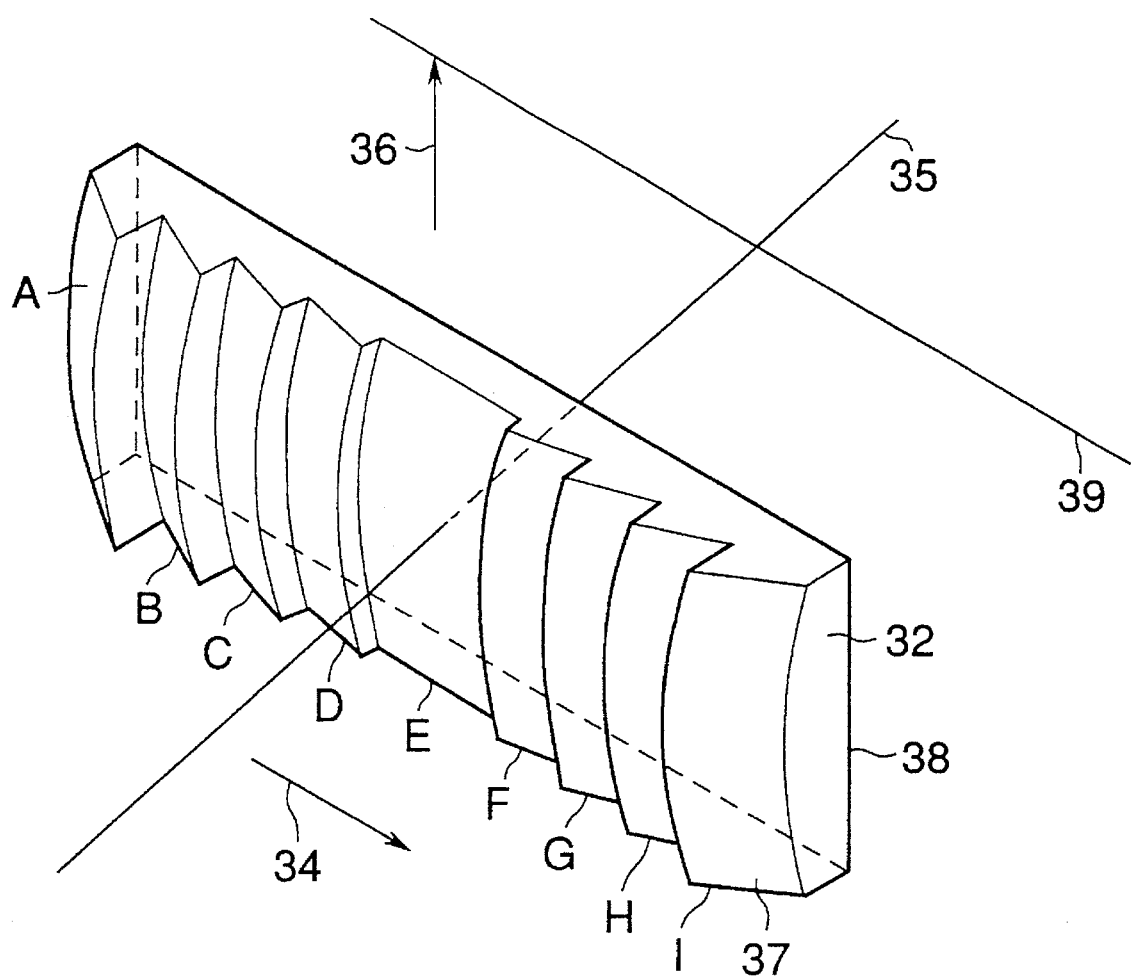
FIG. 5 is a perspective view showing the configuration of Fresnel elements of a Fresnel lens in the illuminating optical system of the present invention.
Figure 6:
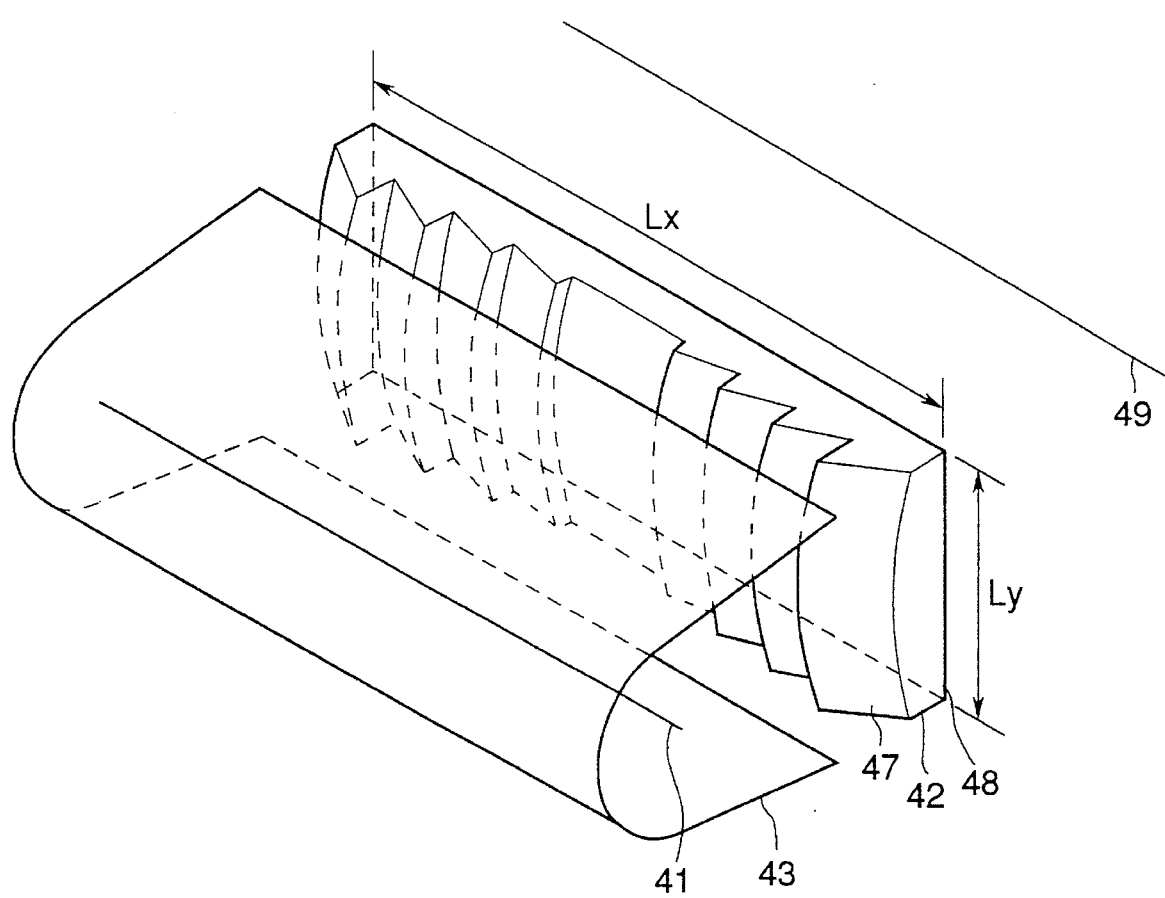
FIG. 6 is a perspective view showing the optical arrangement of the illuminating optical system constituting a first embodiment of the present invention.

FIG. 6 is a perspective view showing the optical arrangement of the illuminating optical system constituting a first embodiment of the present invention. The illuminating optical system is composed of a straight xenon tube 41, a Fresnel lens 42 and a reflector 43, wherein said Fresnel lens 42 is provided with a Fresnel surface 47 at the side of the light source and a flat surface 48 at the object side. The rotary axis of the Fresnel surface 47 is positioned parallel to the xenon tube 41. Lx and Ly indicate the external sizes of the Fresnel lens 42 respectively along the rotary axis 49 and in a direction perpendicular thereto.

Figure 7:
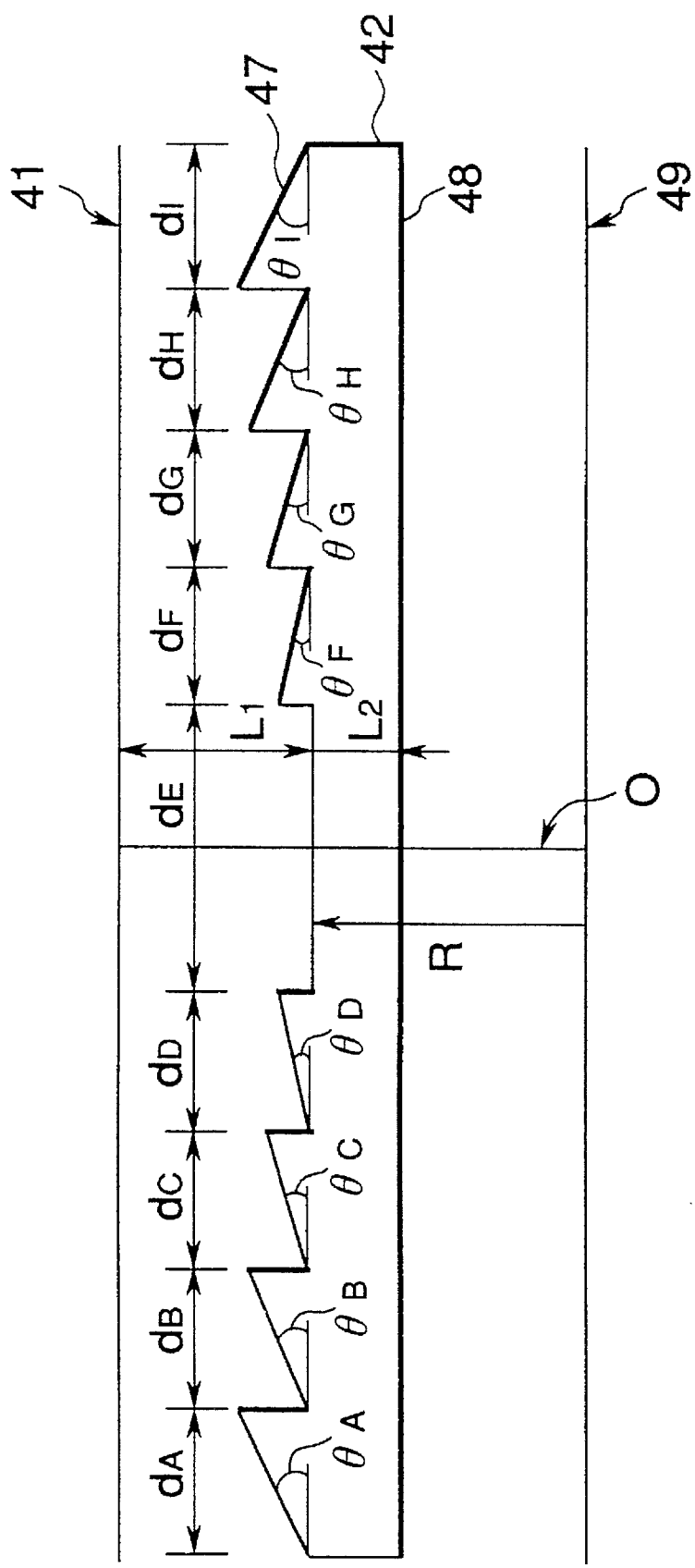
FIG. 7 is a cross-sectional view of a Fresnel lens in the first embodiment of the present invention.

FIG. 7 is a cross-sectional view of the Fresnel lens of the first embodiment of the present invention, along a plane containing the rotary axis 49 and a normal line O, which passes the center of the Fresnel lens 42 and contains the rotary axis 49 and the xenon tube 41. In FIG. 7, L1 indicates the distance from the xenon tube 41 to the Fresnel lens 42 along the normal line O, while L2 indicates the thickness of the Fresnel lens along the normal line O, and R indicates the distance from the rotary axis 49 to the Fresnel surface along the normal line O. The flat surface 48 is positioned perpendicularly to the normal line O. There are also shown Fresnel elements A–I constituting the Fresnel surface, Fresnel angles θA–θI of said Fresnel elements, and lengths dA–dI of said Fresnel elements in the x-direction in FIG. 7.

In the following there are shown parameters representing the shape of the Fresnel lens of the first embodiment of the present invention.

TABLE 1

| Refractive index of Fresnel lens to d-line | | | | |
|---|---|---|---|---|
| ($\lambda = 587.6$ nm) is 1.5. | | | | |
| L1 | = | 15 mm | | |
| L2 | = | 5 mm | | |
| Lx | = | 25 mm | | |
| Ly | = | 10 mm | | |
| R | = | 20 mm | | |
| θA | = | 42° | dA | = 2.5 mm |
| θB | = | 31° | dB | = 2.5 mm |
| θC | = | 23° | dC | = 2.5 mm |
| θD | = | 14° | dD | = 2.5 mm |
| θE | = | 0° | dE | = 5.0 mm |
| θF | = | −14° | dF | = 2.5 mm |
| θG | = | −23° | dG | = 2.5 mm |
| θH | = | −31° | dH | = 2.5 mm |
| θI | = | −42° | dI | = 2.5 mm |

Second Embodiment

Figure 8:
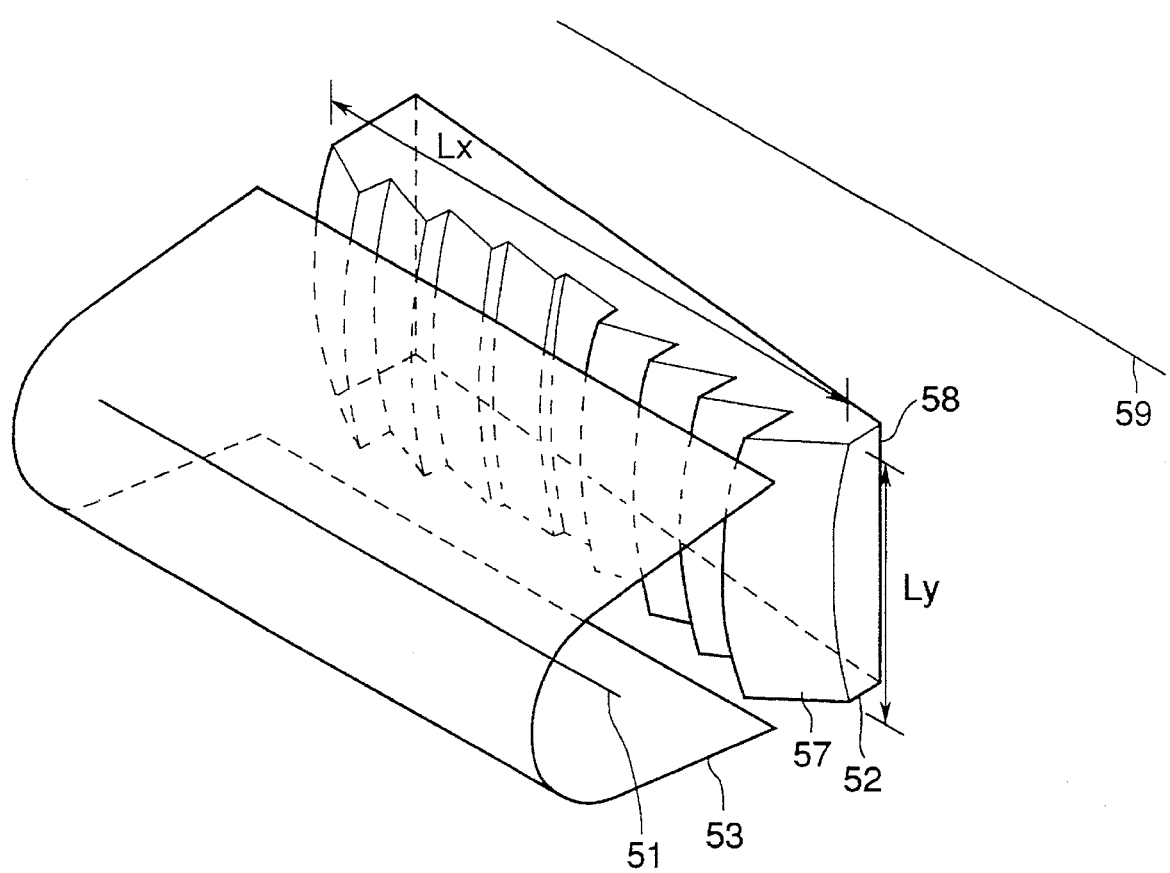
FIG. 8 is a perspective view showing the optical arrangement of the illuminating optical system constituting a second embodiment of the present invention.

FIG. 8 is a perspective view showing the optical arrangement of the illuminating optical system constituting a second embodiment of the present invention. The illuminating optical system is composed of a straight xenon tube 51, a Fresnel lens 52 and a reflector 53, wherein said Fresnel lens 52 is provided with a Fresnel surface 57 at the side of the light source and a flat surface 58 at the object side. The rotary axis 59 of said Fresnel surface 57 is positioned parallel to the xenon tube 51. Lx and Ly indicate the external sizes of the Fresnel lens 52 respectively along the rotary axis 59 and in a direction perpendicular thereto.

Figure 9:
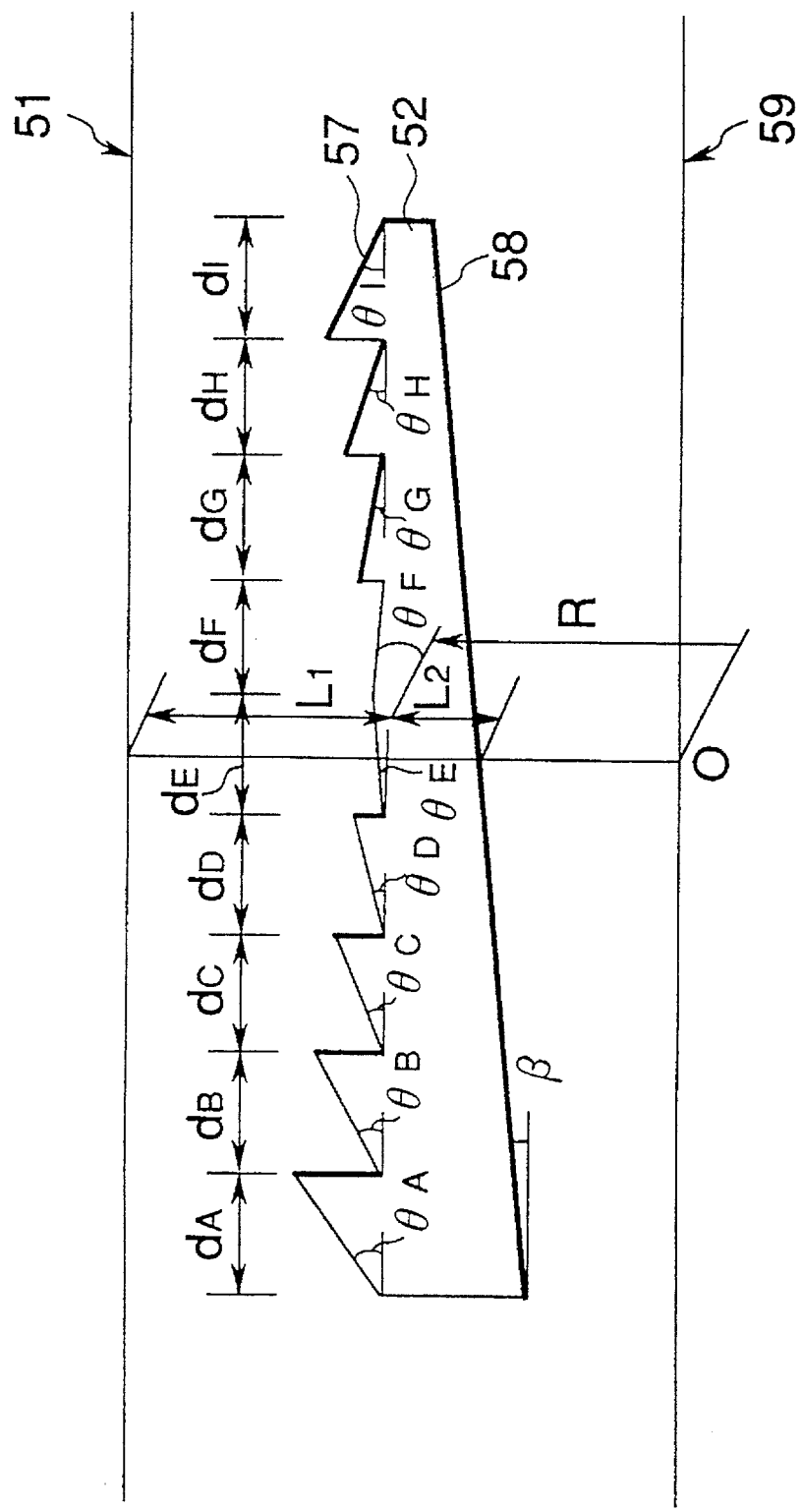
FIG. 9 is a cross-sectional view of a Fresnel lens in the second embodiment of the present invention.

FIG. 9 is a cross-sectional view showing the shape of the Fresnel lens of the second embodiment of the present invention, along a plane containing the rotary axis 59 and a normal line O, which passes the center of the Fresnel lens 52 and connects the rotary axis 59 and the xenon tube 51. In FIG. 9, L1 indicates the distance from the xenon tube 51 to the Fresnel lens 52 along the normal line O, while L2 indicates the thickness of the Fresnel lens along the normal line O, and R indicates the distance from the rotary axis 59 to the Fresnel surface 57 along the normal line O. The flat surface 58 is positioned with an angle β to the rotary axis 59. There are also shown Fresnel elements A–I constituting the Fresnel surface, Fresnel angles θA–θI of said Fresnel lens, and lengths dA–dI of said Fresnel elements in the x-direction in FIG. 9.

In the following there are shown parameters representing the shape of the Fresnel lens in the second embodiment of the present invention.

TABLE 2

| Refractive index of Fresnel lens to d-line | | |
|---|---|---|
| ($\lambda = 587.6$ nm) is 1.5. | | |
| L1 | = | 15 mm |
| L2 | = | 5 mm |
| Lx | = | 27 mm |
| Ly | = | 10 mm |
| R | = | 25 mm |
| β | = | 5° |

TABLE 2-continued

| Refractive index of Fresnel lens to d-line | | | | |
|---|---|---|---|---|
| ($\lambda$ = 587.6 nm) is 1.5. | | | | |
| θA | = | 36.0° | dA | = | 3 mm |
| θB | = | 28.5° | dB | = | 3 mm |
| θC | = | 21.0° | dC | = | 3 mm |
| θD | = | 13.5° | dD | = | 3 mm |
| θE | = | 5.0° | dE | = | 3 mm |
| θF | = | −3.5° | dF | = | 3 mm |
| θG | = | −11.0° | dG | = | 3 mm |
| θH | = | −18.5° | dH | = | 3 mm |
| θI | = | −26.0° | dI | = | 3 mm |

Third embodiment

Figure 10D:
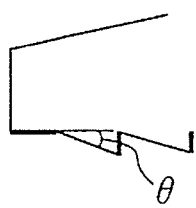
Figure 10C:
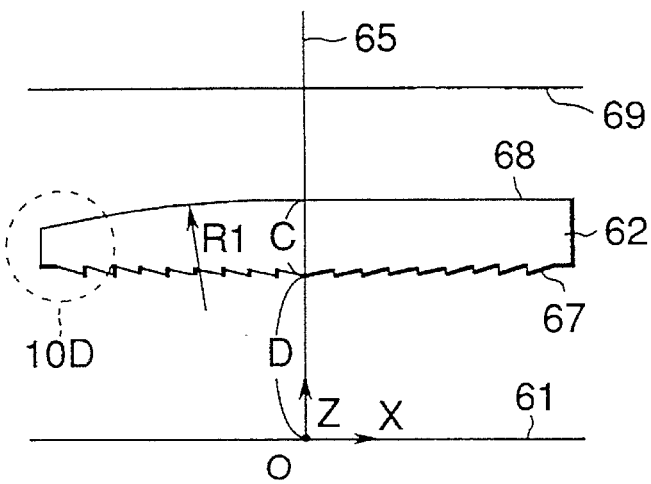
Figure 10B:
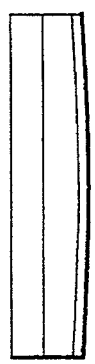
Figure 10A:
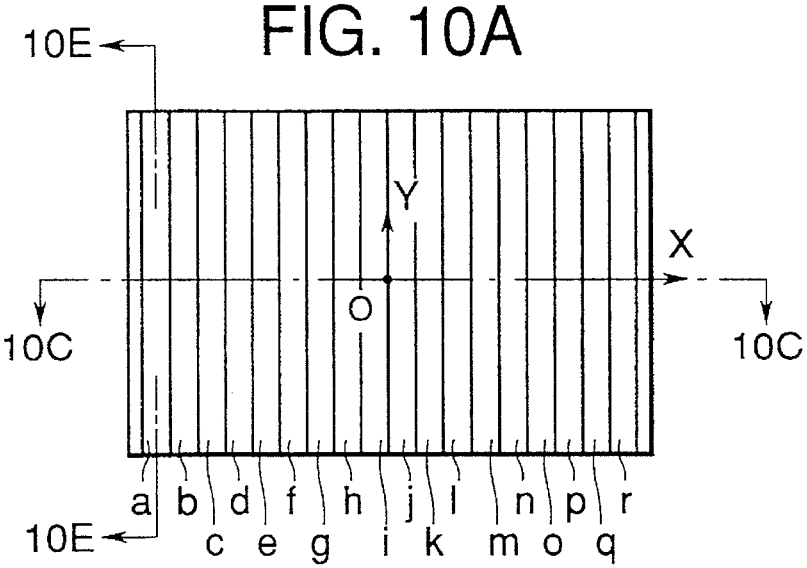
Figure 10E:
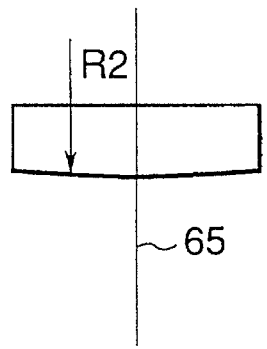

FIGS. 10A to 10E are views showing the optical arrangement of the illuminating optical system constituting a third embodiment of the present invention, wherein FIGS. 10A and 10B are respectively a front view and a lateral view of the Fresnel surface 67 of a Fresnel lens 62, FIG. 10C is a cross-sectional view along a line 10C—10C in FIG. 10A, FIG. 10D is a magnified partial view of FIG. 10C, and FIG. 10E is a cross-sectional view along a line 10E—10E in FIG. 10A.

A right-handed xyz coordinate system is defined, as shown in these drawings, with the original point O selected at the crossing point of the longitudinal axis of the xenon tube 61 and the central axis 65 of the external size of the Fresnel lens, the x-axis selected along the longitudinal direction of the xenon tube 61 and the z-axis selected along the central axis 65 toward the Fresnel lens 62.

A Fresnel surface 67 of the Fresnel lens 62, provided at the side of the xenon tube 61 (at the light source side), is composed of 18 Fresnel elements a–r each having a rectangular shape when viewed in the x-y plane. Said Fresnel elements a–r have Fresnel structure in the x-direction, with respective Fresnel angles θa–θr. Said Fresnel elements a–r are formed into a cylindrical surface defined by a radius R2 of curvature having the center at the rotary axis 69. In the present embodiment, said radius R2 of curvature is 126 mm and is constant along the x-direction.

The surface 68 of the Fresnel lens 62 at the illuminated range side is formed flat in the right-hand side (x≧0) in the drawing, but, in the left-hand side (x<0), is formed as a cylindrical surface having a radius R1 of curvature of 40 mm.

Referring to FIG. 10C, the distance between the surface 68 of the Fresnel lens 62 at the illuminated range side and the Fresnel surface 67 along the z-axis, namely the central thickness C of the lens, is 2.5 mm. Also the distance D between the axis of the xenon tube 61 and the Fresnel surface 67 of the Fresnel lens 62 along the z-axis is 6 mm, and the external size of said Fresnel lens 62 is 12.2 mm (y-direction)×19 mm (x-direction). A refractive index n of the Fresnel lens to the d-line ($\lambda$=587.6 nm) is 1.5.

Following Table 3 shows the central x-coordinates of the Fresnel elements a–r and the corresponding Fresnel angles θa–θr, as parameters defining the shape of the Fresnel elements of the Fresnel lens 62 in the third embodiment.

TABLE 3

| x = | −8.5 mm | θa | = | 14.32° |
|---|---|---|---|---|
| x = | −7.5 mm | θb | = | 13.43° |
| x = | −6.5 mm | θc | = | 10.80° |
| x = | −5.5 mm | θd | = | 6.71° |
| x = | −4.5 mm | θe | = | 8.79° |
| x = | −3.5 mm | θf | = | 9.79° |

TABLE 3-continued

| x = | −2.5 mm | θg | = | 9.55° |
|---|---|---|---|---|
| x = | −1.5 nm | θh | = | 7.77° |
| x = | −0.5 mm | θi | = | 4.37° |
| x = | +0.5 mm | θj | = | 6.42° |
| x = | +1.5 mm | θk | = | 10.90° |
| x = | +2.5 mm | θl | = | 13.67° |
| x = | +3.5 mm | θm | = | 14.66° |
| x = | +4.5 mm | θn | = | 14.22° |
| x = | +5.5 mm | θo | = | 12.99° |
| x = | +6.5 mm | θp | = | 16.87° |
| x = | +7.5 mm | θq | = | 19.18° |
| x = | +8.5 mm | θr | = | 20.57 |

Figure 11A:
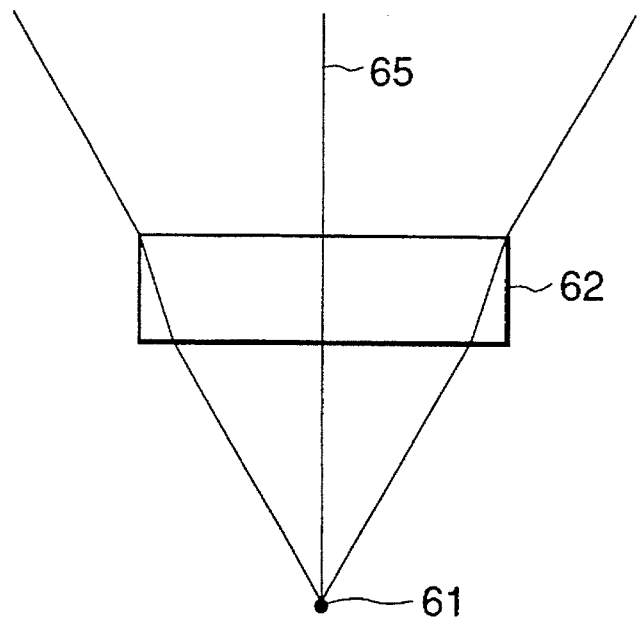
FIGS. 11A and 11B are views showing the paths of illuminating rays passing through the Fresnel lens 62 in the third embodiment, respectively along a y-z plane and x-z plane.
Figure 11B:
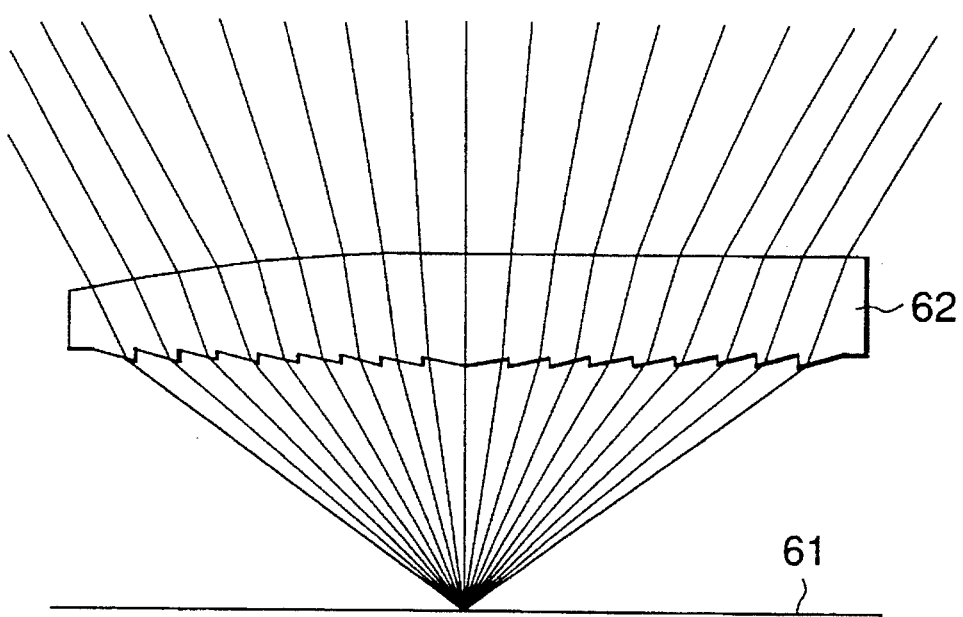

FIGS. 11A and 11B are views showing the paths of illuminating rays passing through the Fresnel lens 62 of the third embodiment, respectively along y-z plane and the x-z plane.

It has been confirmed that the present embodiment can achieve satisfactory illumination of the phototaking range of the phototaking lens, by correction of the deviation of the light beam resulting from the inclination of the surface of the illuminated range side, through suitable variation of the Fresnel angles of the Fresnel lens.

Fourth Embodiment

Figure 12C:
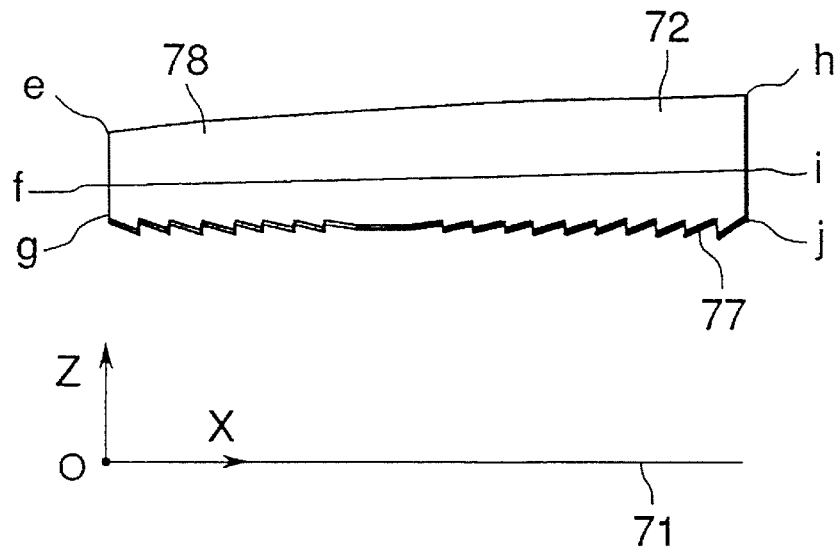
Figures 12A, 12B:
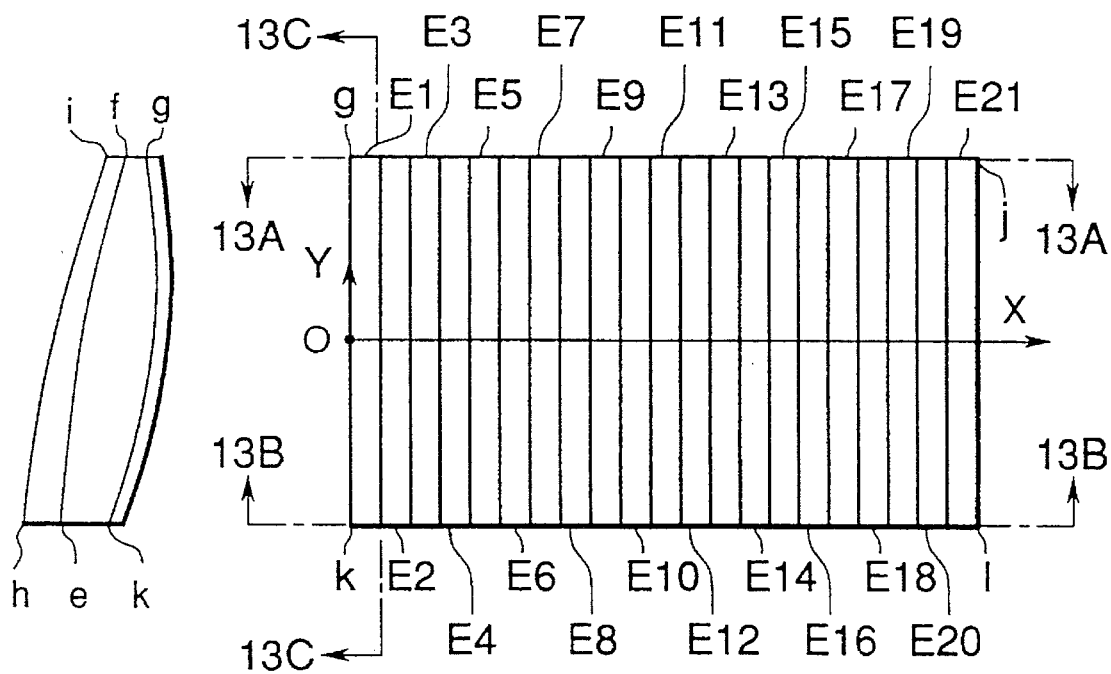

FIGS. 12A to 12C are views showing the optical arrangement of the illuminating optical system constituting a fourth embodiment of the present invention, wherein FIGS. 12A and 12B are respectively a front view and a lateral view of the Fresnel surface 77 of a Fresnel lens 72, while FIG. 12C is a plan view of said Fresnel lens 72.

A right-handed xyz coordinate system is defined as shown in these drawings, with the original point O selected on the axis of a xenon tube 71, x-axis selected in the longitudinal direction of the xenon tube 71, and z-axis selected, in a plane containing the unrepresented central axis of the external sizes of the Fresnel lens and the x-axis, in a direction perpendicular to the x-axis and passing the left-hand end of a Fresnel lens 72 toward the illuminated range side.

The Fresnel surface 77 of the Fresnel lens 72 at the side of the xenon tube 71 (i.e. light source side) is rectangular when viewed from the x-y plane and is composed of 21 Fresnel elements E1–E21, having the Fresnel structure in the x-direction. Said Fresnel elements E1–E21 are respectively constructed in cylindrical forms having the centers on an unrepresented rotary axis.

The surface 78 of the Fresnel lens 72 at the illuminated range side has a radius of curvature of 60 mm in the y-direction. Said radius of curvature remains constant in the x-direction, but the centers of curvature varied in the y-direction among different Fresnel elements. More specifically, the centers of curvature of the cylindrical envelope plane of the different Fresnel elements are not on a straight line.

In FIGS. 12A to 12C, in order to clarify the mutual correlation among different drawings, reference letters e, f, h and i are given to the four corners of the surface 78 of the Fresnel lens 72 at the illuminated range side, while reference letters g, j, k and l are given to the four corners of the Fresnel surface 77 of said Fresnel lens 72.

Figure 13A:
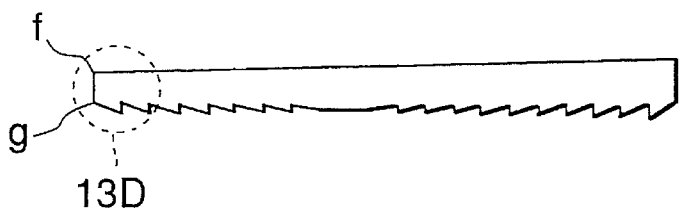
Figure 13B:
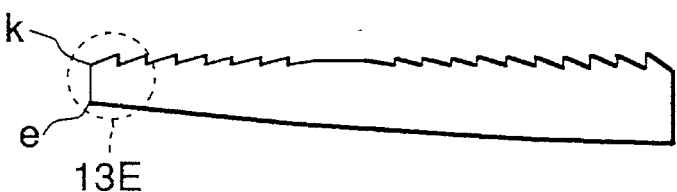
Figure 13C:
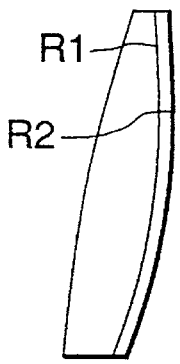
Figure 13D:
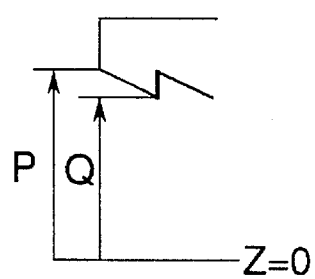
Figure 13E:
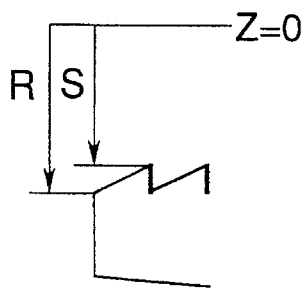
Figure 14:
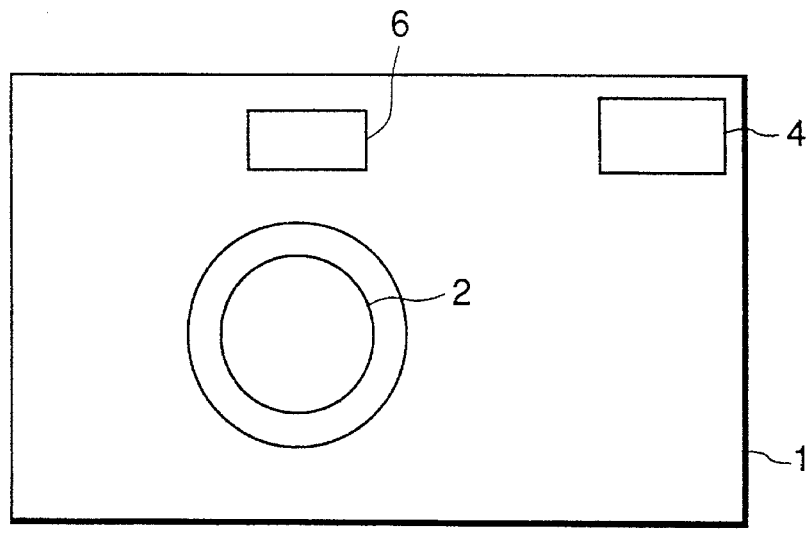
FIG. 14 is a front view of a camera equipped with a conventional illuminating optical system.
Figure 15:
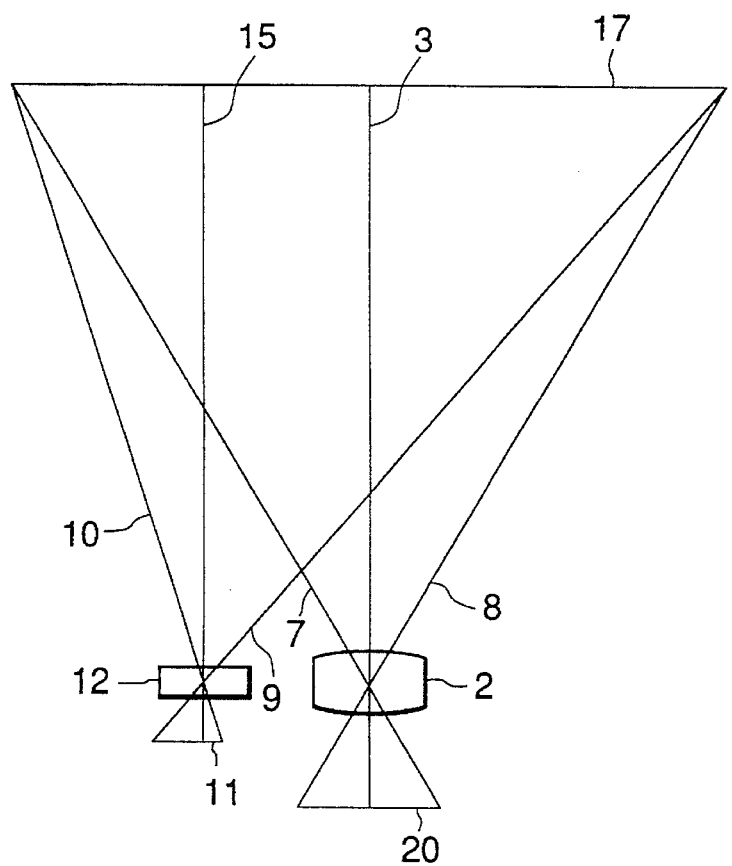
FIG. 15 is a view showing the relationship between the illuminated range by an illuminating optical system and the phototaking range by a phototaking lens.
Figure 16:
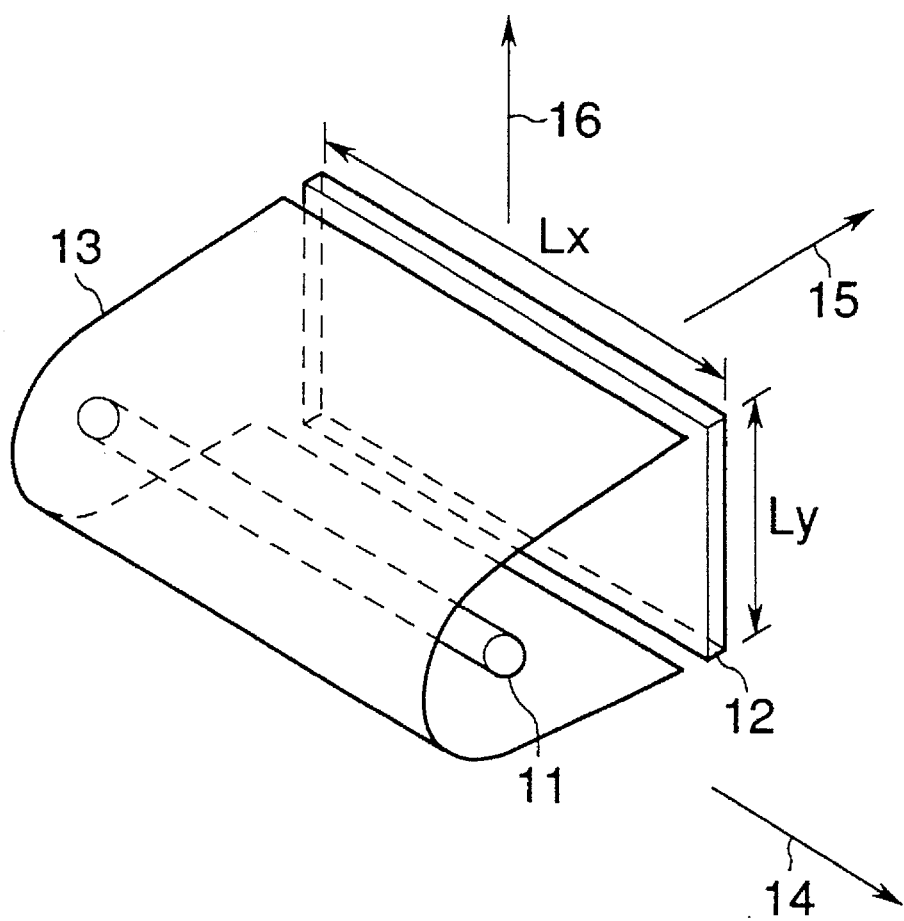
FIG. 16 is a view showing the structure of an illuminating optical system.
Figure 17A:
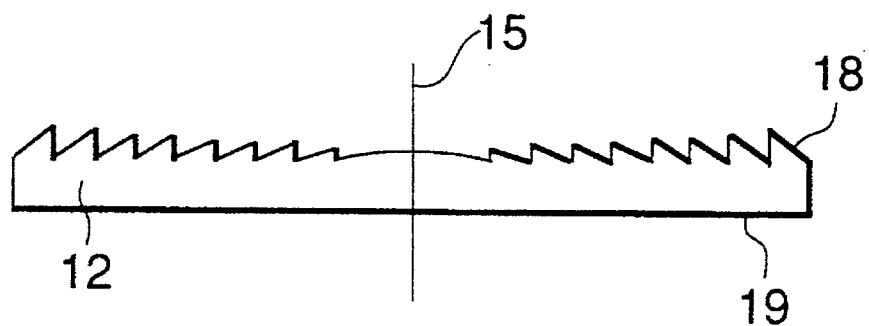
FIGS. 17A and 17B are respectively a cross-sectional view and a plan view of the Fresnel surface of a Fresnel lens 12 in the conventional illuminating optical system.
Figure 17B:
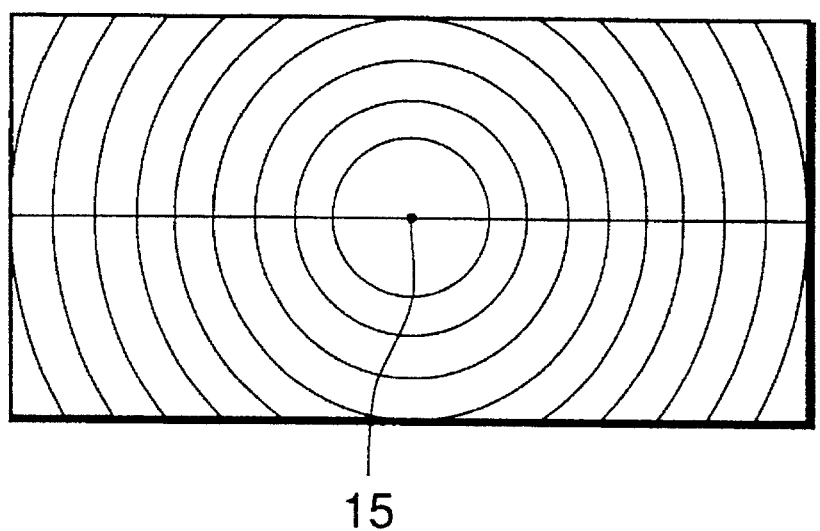

FIGS. 13A to 13E also correspond to FIGS. 12A to 12C, wherein FIG. 13A is an end face view along a line 13A—13A in FIG. 12A; FIG. 13B is an end face view along a line 13B—13B in FIG. 12A; FIG. 13C is a cross-sectional view along a line 13C—13C in FIG. 12A; and FIGS. 13D and 13E are magnified views respectively of FIGS. 13A and 13B. Also in FIGS. 13A and 13B, the above-mentioned reference letters e–l are attached in order to clarify the correlation.

Referring to FIGS. 13C to 13E, two radii R1, R2 of curvature and dimensions P, Q, R and S from the x-y plane ($z=0$) are defined as illustrated as parameters for determining the Fresnel elements on the Fresnel surface 77 of the Fresnel lens 72.

The external dimension of the Fresnel lens 72 is 21 mm (x-direction)×12.2 mm (y-direction), and the refractive index n of the Fresnel lens 72 to the d-line ($\lambda=587.6$ nm) is 1.5.

Following Table 4 shows, as parameters for defining the curved plane of the surface 78 of the Fresnel lens 72 at the illuminated range side in the fourth embodiment, z-coordinate values (sag amounts) in a predetermined x-y coordinate system, and inclinations, in the x-directions, of the normal line at a predetermined x-coordinate to the crossing line between the x-z plane ($y=0$) and the surface 78.

Following Table 5 shows, as the parameters for defining the Fresnel elements of the Fresnel surface 77 of the Fresnel lens 72 of the fourth embodiment, the aforementioned two radii R1, R2 of curvature and the four dimensions P, Q, R and S for the Fresnel elements 1 to 21.

TABLE 4

| | | z-coordinate (mm) in a predetermined x-y coordinate system | | | inclination of normal line (y = 0.0) | |
|---|---|---|---|---|---|---|
| | | y = 5.7 | y = -6.5 | y = 0.0 | y-direction | x-direction |
| x = | 0.5 | z = 7.1034 | z = 8.9087 | z = 8.2669 | 8.8° | 4.54° |
| | 1.5 | 7.1458 | 9.0198 | 8.3423 | 9.1 | 4.34 |
| | 2.5 | 7.1874 | 9.1251 | 8.4144 | 9.4 | 4.15 |
| | 3.5 | 7.2278 | 9.2250 | 8.4833 | 9.6 | 3.96 |
| | 4.5 | 7.2671 | 9.3194 | 8.5491 | 9.9 | 3.78 |
| | 5.5 | 7.3049 | 9.4091 | 8.6118 | 10.1 | 3.60 |
| | 6.5 | 7.3411 | 9.4942 | 8.6716 | 10.3 | 3.425 |
| | 7.5 | 7.3765 | 9.5741 | 8.7284 | 10.5 | 3.25 |
| | 8.5 | 7.4103 | 9.6496 | 8.7822 | 10.7 | 3.08 |
| | 9.5 | 7.4426 | 9.7206 | 8.8332 | 10.9 | 2.91 |
| | 10.5 | 7.4733 | 9.7875 | 8.8814 | 11.1 | 2.74 |
| | 11.5 | 7.5027 | 9.8498 | 8.9266 | 11.2 | 2.57 |
| | 12.5 | 7.5309 | 9.9075 | 8.9690 | 11.4 | 2.405 |
| | 13.5 | 7.5573 | 9.9613 | 9.0087 | 11.5 | 2.24 |
| | 14.5 | 7.5822 | 10.0109 | 9.0455 | 11.6 | 2.075 |
| | 15.5 | 7.6054 | 10.0564 | 9.0797 | 11.7 | 1.91 |
| | 16.5 | 7.6271 | 10.0978 | 9.1107 | 11.8 | 1.745 |
| | 17.5 | 7.6471 | 10.1352 | 9.1391 | 11.9 | 1.58 |
| | 18.5 | 7.6655 | 10.1685 | 9.1647 | 11.9 | 1.415 |
| | 19.5 | 7.6820 | 10.1982 | 9.1876 | 12.0 | 1.25 |
| | 20.5 | 7.6936 | 10.2235 | 9.2077 | 12.0 | 1.25 |

TABLE 5

| | P | Q | R | S | R1 | R2 |
|---|---|---|---|---|---|---|
| E1 | z = 6.2847 | z = 5.8377 | z = 7.3605 | z = 6.8941 | 25.779 | 26.221 |
| E2 | 6.2393 | 5.8441 | 7.3721 | 6.9599 | 25.805 | 26.195 |
| E3 | 6.1974 | 5.8563 | 7.3670 | 7.0105 | 26.731 | 27.169 |
| E4 | 6.1216 | 5.8375 | 7.3233 | 7.0263 | 27.859 | 28.141 |
| E5 | 6.1084 | 5.8806 | 7.3096 | 7.0716 | 27.887 | 28.113 |
| E6 | 6.0671 | 5.8959 | 7.3098 | 7.1306 | 27.915 | 28.085 |
| E7 | 6.0052 | 5.8904 | 7.3028 | 7.1826 | 28.443 | 28.557 |
| E8 | 5.9780 | 5.9116 | 7.2832 | 7.2137 | 28.967 | 29.033 |
| E9 | 5.9441 | 5.9280 | 7.2798 | 7.2650 | 28.993 | 29.007 |
| E10 | 5.8915 | 5.9920 | 7.2063 | 7.3114 | 30.050 | 29.950 |
| E11 | 5.9334 | 5.9334 | 7.2797 | 7.2797 | 30.000 | 30.000 |
| E12 | 5.8714 | 5.9819 | 7.2412 | 7.3570 | 30.055 | 29.945 |
| E13 | 5.8725 | 6.0252 | 7.2231 | 7.3830 | 30.076 | 29.934 |
| E14 | 5.8437 | 6.0426 | 7.2246 | 7.4231 | 30.099 | 29.901 |
| E15 | 5.7603 | 6.0091 | 7.1781 | 7.4384 | 32.124 | 31.876 |
| E16 | 5.7018 | 5.9984 | 7.1567 | 7.4671 | 33.148 | 32.852 |
| E17 | 5.7193 | 6.0662 | 7.1247 | 7.4872 | 33.173 | 32.827 |
| E18 | 5.6938 | 6.0848 | 7.1117 | 7.5204 | 33.195 | 32.805 |
| E19 | 5.6276 | 6.0705 | 7.0885 | 7.5515 | 34.221 | 33.779 |
| E20 | 5.6012 | 6.0921 | 7.0711 | 7.5854 | 34.245 | 33.755 |
| E21 | 5.5644 | 6.1254 | 7.0401 | 7.6268 | 34.280 | 33.720 |

It has thus been confirmed that the present embodiment can achieve satisfactory illumination of the phototaking range of the phototaking lens by correction of the deviation of the light beam, resulting from the inclination of the surface at the illuminated range side, through suitable variations in the Fresnel angles of the Fresnel elements and the radii of curvature of the cylindrical envelope planes of said Fresnel elements.

In the foregoing embodiments, the light source is composed of a xenon tube, but there may also be employed for example a halogen lamp or an LED.

As explained in the foregoing, the Fresnel lens of the illuminating optical system of the present invention is, unlike the conventional Fresnel lens, not rotationally symmetrical. For this reason the light distribution can be easily corrected in case the surface of the Fresnel lens at the illuminated range side is not flat. It is also easy to obtain further improved light distribution characteristics by forming an aspherical envelope plane in a direction perpendicular to the rotary axis of the cylindrical envelope plane.

Having described preferred embodiments of the present invention, it is to be understood that any variation will occur to those skilled in the art within the scope of the appended claims.

What is claimed is:

1. A camera provided with an illuminating optical system for illuminating a phototaking range of a phototaking lens, wherein:

said illuminating optical system comprises a light source emitting a light beam, and a Fresnel lens refracting said light beam, said Fresnel lens having a first surface without a Fresnel structure, and a second surface having a cylindrical envelope plane having a Fresnel structure comprising plural Fresnel elements, each Fresnel element having a truncated conical plane; and wherein a cross-section of said plural Fresnel elements along a rotary central axis of said cylindrical envelope plane has said Fresnel structure.

2. The camera according to claim 1, wherein said second surface is disposed near a side of said light source.

3. The camera according to claim 2, wherein said first surface is disposed near a side of the illuminated phototaking range and is inclined to an optical axis of said phototaking lens.

4. The camera according to claim 1, wherein a Fresnel angle of each of said plural Fresnel elements is varied among said plural Fresnel elements according to the inclination of said first surface of said Fresnel lens, thereby correcting a deviation of said light beam that results from said inclination of said Fresnel lens at said first side.

5. The camera according to claim 1, wherein a truncated conical shape of each of said plural Fresnel elements is varied among said plural Fresnel elements according to the inclination of said first surface of said Fresnel lens, thereby correcting a deviation of said light beam that results from said inclination of said Fresnel lens at said first side.

6. The camera according to claim 1, wherein a Fresnel angle and a truncated conical shape of said plural Fresnel elements are varied among said plural Fresnel elements according to the inclination of said first surface of said Fresnel lens, thereby correcting a deviation of said light beam that results from said inclination of said Fresnel lens at said first side.

7. The camera according to claim 1, wherein each of said plural Fresnel elements has a rectangular shape.

8. The camera according to claim 7, wherein said light source is rod-shaped, and said rotary central axis of said cylindrical envelope plane is substantially parallel to a longitudinal axis of said light source.

9. The camera according to claim 8, wherein an external shape of said Fresnel lens is rectangularly elongated in the direction of said longitudinal axis of said light source.

10. The camera according to claim 9, wherein said light source is a xenon flash lamp.

\* \* \* \* \*